(12) United States Patent
Ryu

(10) Patent No.: US 8,842,425 B2
(45) Date of Patent: Sep. 23, 2014

(54) VARIABLE DISPLAY AREA TYPE DISPLAY DEVICE

(76) Inventor: Sang-Kyu Ryu, Gyeonggi-do (KR)

( * ) Notice: Subject to any disclaimer, the term of this patent is extended or adjusted under 35 U.S.C. 154(b) by 42 days.

(21) Appl. No.: 13/394,899

(22) PCT Filed: Sep. 14, 2010

(86) PCT No.: PCT/KR2010/006277
§ 371 (c)(1),
(2), (4) Date: Mar. 28, 2012

(87) PCT Pub. No.: WO2011/031122
PCT Pub. Date: Mar. 17, 2011

(65) Prior Publication Data
US 2012/0200991 A1    Aug. 9, 2012

(30) Foreign Application Priority Data

Sep. 14, 2009  (KR) .................. 10-2009-0086395
Sep. 10, 2010  (KR) .................. 10-2010-0089082

(51) Int. Cl.
*H05K 7/16*       (2006.01)
*G06F 1/16*       (2006.01)

(52) U.S. Cl.
CPC .................................. *G06F 1/1652* (2013.01)
USPC .............. 361/679.27; 361/679.21; 455/575.3

(58) Field of Classification Search
CPC ... G06F 1/1652; G06F 1/1613; G06F 1/1647; G06F 1/1601; G06F 1/1626; G06F 1/1656; G06F 3/1423; G06F 3/14; H05K 1/0277; H05K 1/028; H05K 7/14; H05K 7/00

USPC .......... 361/679.01, 679.02, 679.08, 679.09, 361/679.21, 679.22, 679.26, 679.27, 679.3, 361/679.29, 679.16, 679.55–679.58; 455/575.1–575.4

See application file for complete search history.

(56) References Cited

U.S. PATENT DOCUMENTS

| | | | |
|---|---|---|---|
| 6,262,785 B1 * | 7/2001 | Kim ................................ | 349/58 |
| 7,787,917 B2 * | 8/2010 | Aoki et al. .................. | 455/575.3 |
| 8,253,650 B2 * | 8/2012 | Sip et al. ......................... | 345/1.3 |
| 8,379,377 B2 * | 2/2013 | Walters et al. ........... | 361/679.04 |
| 2005/0248501 A1 * | 11/2005 | Kim ................................ | 345/1.1 |
| 2007/0097014 A1 | 5/2007 | Solomon et al. | |
| 2008/0134550 A1 | 6/2008 | Sun et al. | |

FOREIGN PATENT DOCUMENTS

| | | |
|---|---|---|
| CN | 1254730 C | 5/2006 |
| JP | 2004118803 A | 4/2004 |
| KR | 1020080093340 A | 10/2008 |
| KR | 1020090014726 A | 2/2009 |

* cited by examiner

*Primary Examiner* — Anthony Haughton
*Assistant Examiner* — Ingrid Wright
(74) *Attorney, Agent, or Firm* — AKC Patents LLC; Aliki K. Collins (57) ABSTRACT

The present invention relates to a variable display area type display device having a structure which can selectively extend or reduce a display area. The present invention comprises: a base plate having a foldable body; a display unit which is installed on one surface of the base plate and in which the display area is folded and changed by the folding of the base plate; and a plate supporting member for supporting the base plate before or after the folding of the base plate.

6 Claims, 9 Drawing Sheets

VARIABLE DISPLAY AREA TYPE DISPLAY DEVICE

TECHNICAL FIELD

The present invention relates to a display device, and in particular to a variable display area type display device which makes it possible to actually expand or reduce a display area.

BACKGROUND ART

A display device is applied in various forms to electronic devices. The display device can be applied to a mobile terminal such as a common cellular phone, a PDA, a smart phone, a small size notebook, etc. as well as to various electronic appliances such as a desktop computer, a television set, etc., thus displaying information.

It is common that a portable mobile terminal has a relatively small display area at a display device now that it is generally designed to have a light, thin, short and small structure. In case that it is needed for a user to have a screen bigger than the size of a terminal body, a user might need to carry an additional display device, which consequently causes a lot of inconvenience.

In case of an electronic device which does not need a portability, changing the size of a screen is impossible, so it is impossible to meet a demand for a display which can be applied to various market's demand.

Technical Problem

The present invention is invented to overcome the above-described problems. It is an object of the present invention to provide a variable display area type display device which provides a foldable display area corresponding to a screen.

Technical Solution

To achieve the above objects, there is provided a variable display area type display device which comprises a base plate having a foldable body; a display part which is installed at one surface of the base plate and has a display area which varies as the display area is folded and changed by the folding of the base plate; and a plate support member which supports the base plate before or after the base plate is folded.

It is preferred that the base plate comprises a hinge part; and a pair of plate units which are coupled with each other in a foldable way about the hinge part.

The display part is formed of a flexible display which is entirely attached to the pair of the plate units. Alternatively, the display part might be formed of a pairs of displays correspondingly attached to the pair of the plate units.

The plate support member comprises a support part corresponding to a plane portion of the base plate; and a guide part which is provided at an edge portion of each of both sides of the support part and has a guide groove guiding the edge portion of each of both sides of the base plate.

It is preferred that in a state that the base plate is folded, an edge portion of each of both sides of one plate unit between the pair of the plate units keeps being guided by means of the guide part.

At an end portion of one plate unit, there is provided a pivot member for providing a rotation center for an inverted operation of one plate unit while at the same time preventing the base plate from escaping from the plate support member.

It is preferred that the base plate and the plate support member are formed in rectangular shapes, and the entire length of the base plate is two times the length of the plate support member.

Advantageous Effects

In the present invention, it is possible to provide a screen with various areas or types in which the size of a display area can be reduced or expanded in such a way to fold or unfold a display part depending on the environment of use.

Also, the durability of a display can be enhanced now that a display part can be stably supported and guided with the aid of a base plate and a plate support member.

In the application of the present invention, it is possible to provide a screen relatively bigger than that of a terminal body for thereby maximizing the convenience of use of various mobile terminal.

The present invention can be applied to various types of electronic instruments, so its universality can be advantageously maximized.

BRIEF DESCRIPTION OF THE DRAWINGS

The present invention will become better understood with reference to the accompanying drawings which are given only by way of illustration and thus are not limitative of the present invention, wherein.

BEST MODES FOR CARRYING OUT THE INVENTION

Hereinafter the preferred embodiments of the present invention will be described with reference to the accompanying drawings. The terms or words used in the descriptions and claims should not be interpreted on a conventional or dictionary basis, but should be interpreted on a meaning and concept basis well matching with the technical concepts of the present invention with the principle that the inventor can properly define the concepts of the terms to explain his invention in the best way. The embodiments and the constructions shown in the specification are only the preferred embodiments of the present invention, not expressing the technical concepts of the present invention, so it should be interpreted that there are various alternative equivalents and modifications at the time the application is made.

Figure 1:
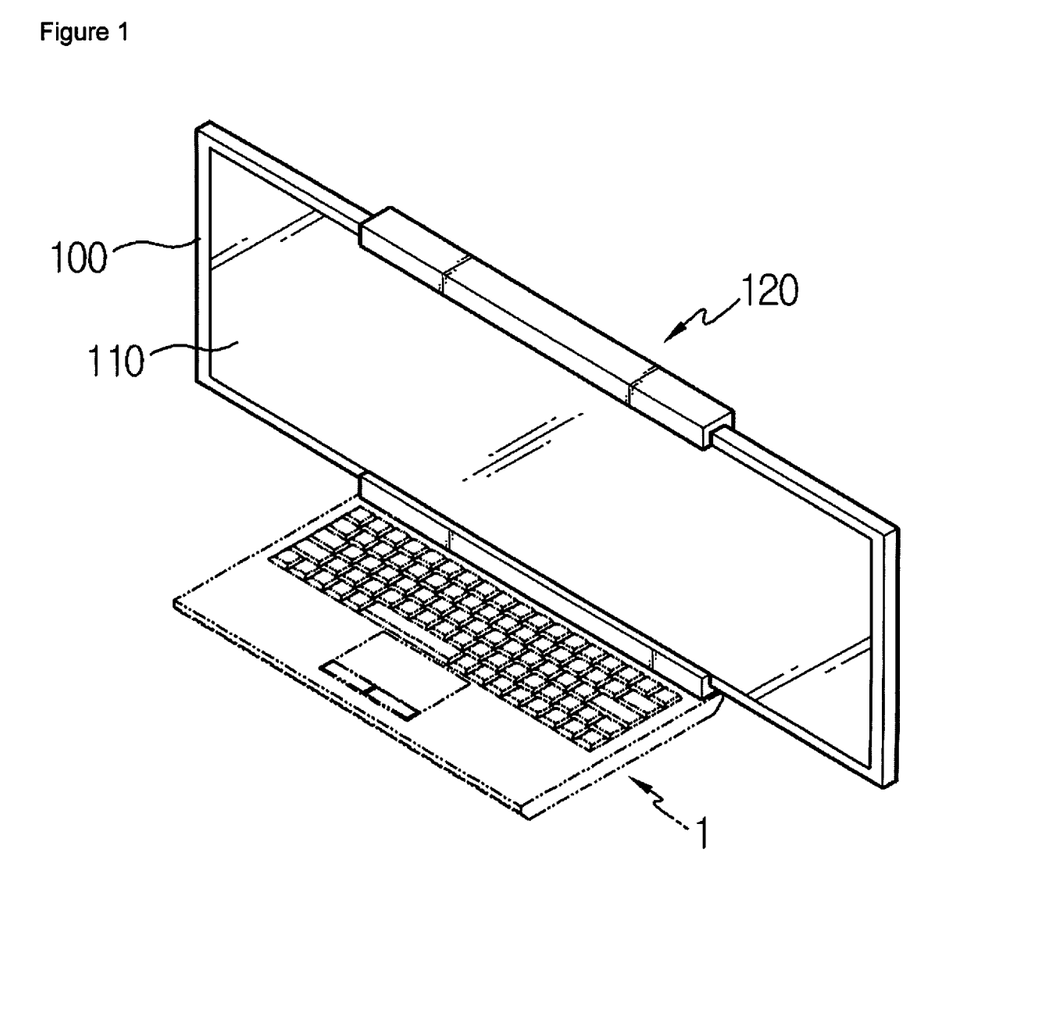
FIG. 1 is a perspective view illustrating an outer appearance of a variable display area type display device according to a preferred embodiment of the present invention.

FIG. 1 is a perspective view illustrating an outer appearance of a variable display area type display device according to a preferred embodiment of the present invention.

As shown in FIG. 1, the variable display area type display device according to a preferred embodiment of the present invention comprises a base plate 100 having a foldable body, a display part 110 installed at one surface of the base plate 100, and a plate support member 120 supporting and guiding the base plate 100.

FIG. 1 shows an example in which the variable display area type display device is mounted at one side of the body of a notebook computer 1. The applicable field of the present invention is not limited thereto. It can be applied to various electronic instruments such as a common cellular phone, a PDA, a smart phone, a PC. A TV, etc. The present invention can be implemented in a form of a separate product, not being adapted to a separate electronic instrument.

Figure 2:
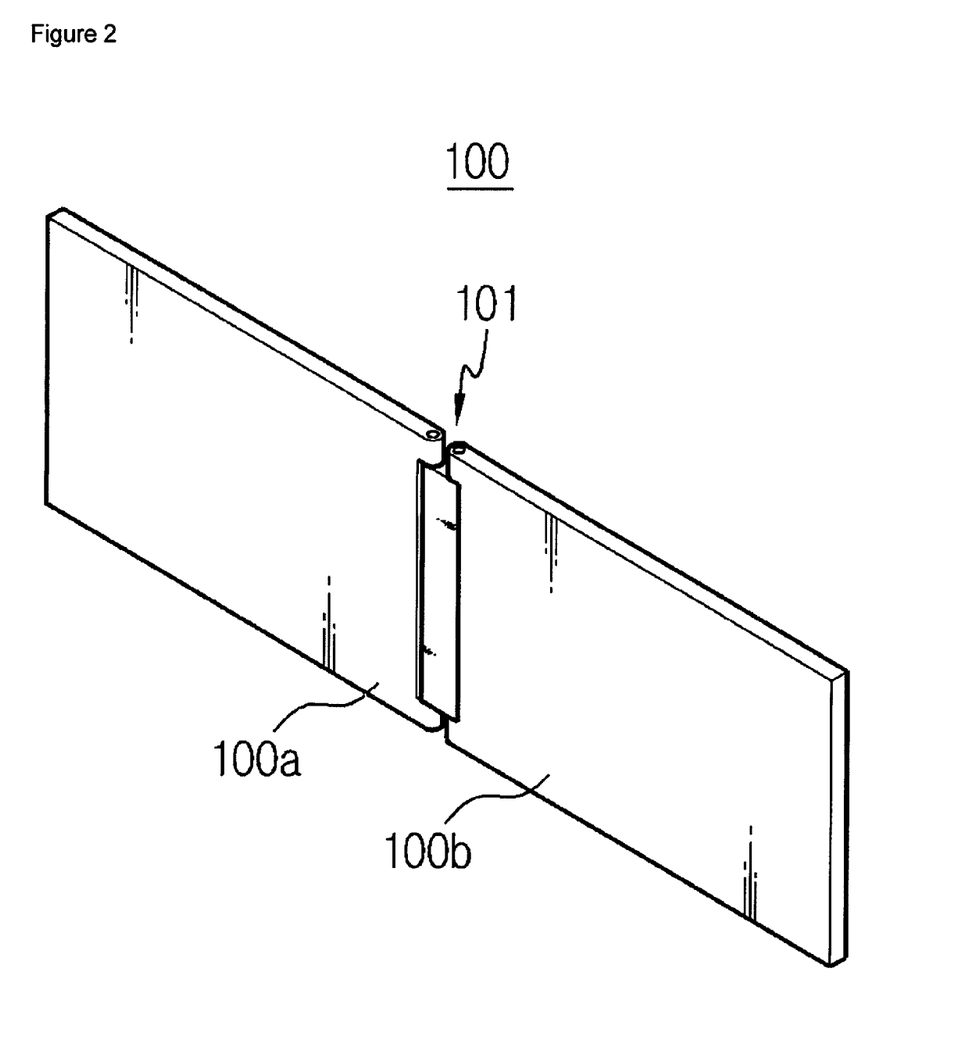
FIG. 2 is a perspective view illustrating a construction of a base plate of FIG. 1.

As shown in FIG. 2, the base plate 100 is formed in a rectangular shape and is characterized in that a pair of plate units 100a and 100b are coupled with each other in a hinged structure, so they are foldable in forward and backward directions. A pair of the plate units 100a and 100b are hinged via a hinge part 101 positioned at its intermediate portion. Not shown in the drawings, a stopper is provided at the hinge part 101, thus defining a rotation angle between the pair of the plate units 100a and 100b.

The display part 110 is attached to one surface of the base plate 100 and operates in sync with the base plate 100 and is folded or unfolded, thus reducing or expanding the display area.

Figure 3:
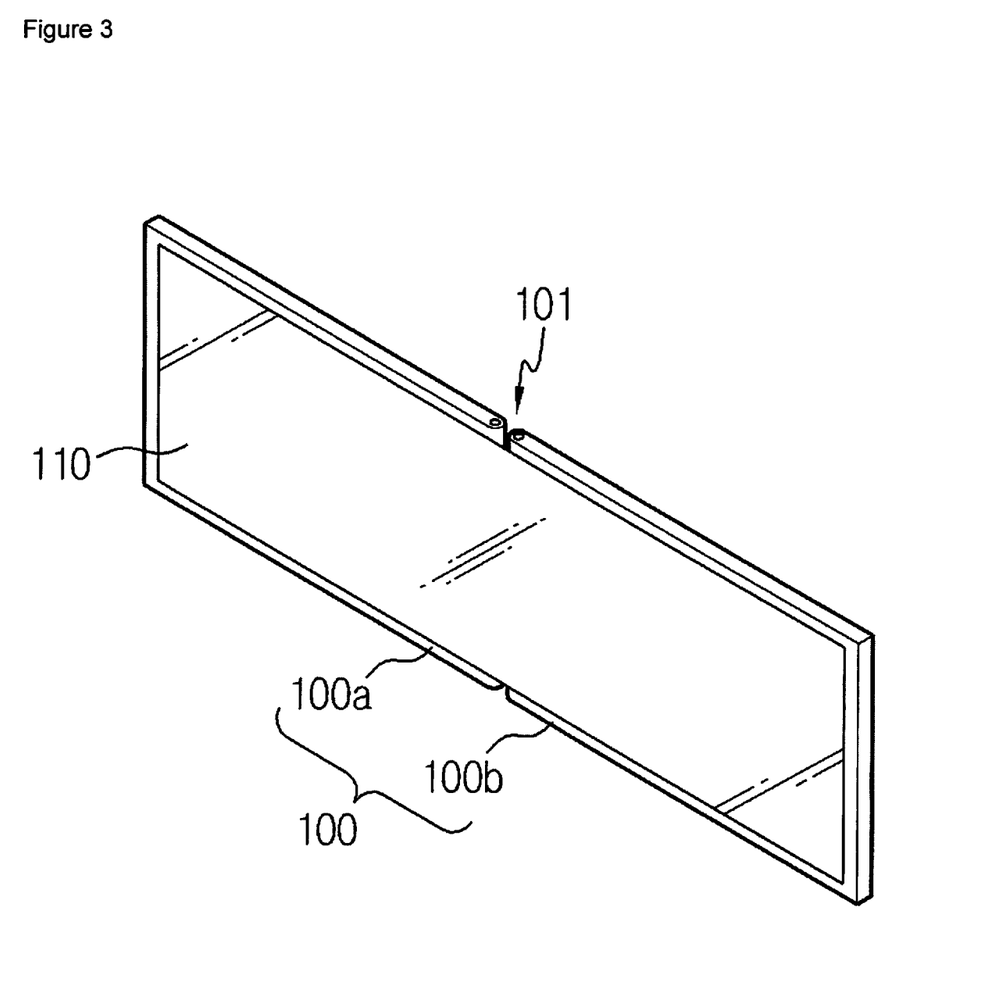
FIG. 3 is a perspective view illustrating a construction that a flexible display is installed at a base plate according to an embodiment of the present invention.

As shown in FIG. 3, the display part 110 can be formed of a flexible display which is attached along its entire lengths while crossing the pair of the plate units 100a and 100b. In this case, when the base plate 100 is folded or unfolded, the flexible display can be folded or unfolded together with the base plate 100.

Figure 4:
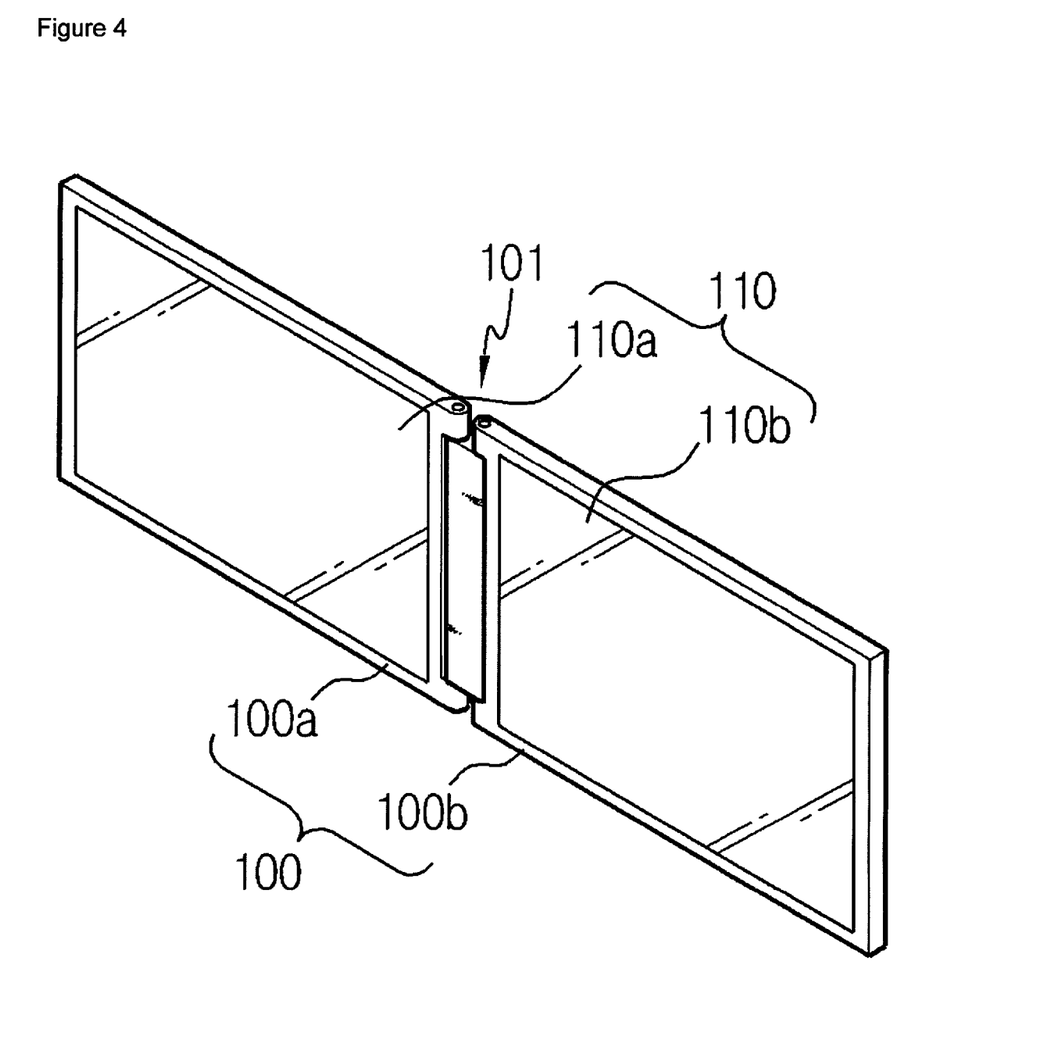
FIG. 4 is a perspective view illustrating a construction that a pair of displays are installed at a base plate according to another embodiment of the present invention.

As shown in FIG. 4, the display part 110 is formed of a pair of displays 110a and 110b attached matching with the pair of the plate units 100a and 100b, respectively. The pair of the displays 110a and 110b might be formed of LCD, PDP, OLED, AMOLED, etc. In this case, when the base plate 100 is folded or unfolded, the pair of the displays 110a and 110b are folded or unfolded together with the base plate 100.

The base plate 100 attached to the display part 110 is supported and guided by the plate support member 120. Here, the plate support member 120 serves to guide the base plate 100 before and after the base plate 100 is folded and unfolded, and serves to support the base plate 100 which is expanded or reduced. The plate support member 120 can be detachably coupled to an electronic instrument such as a notebook computer or the like, for which a coupling means such as a bolt, a hinge assembly, etc for the coupling with a certain object can be provided at one side of the plate support member 120.

Preferably, at one side of the plate support member 120 is provided a fixing means in a certain clamp shape or a holder shape, thus fixing the folded base plate 100 to the plate support member 120.

Figure 5:
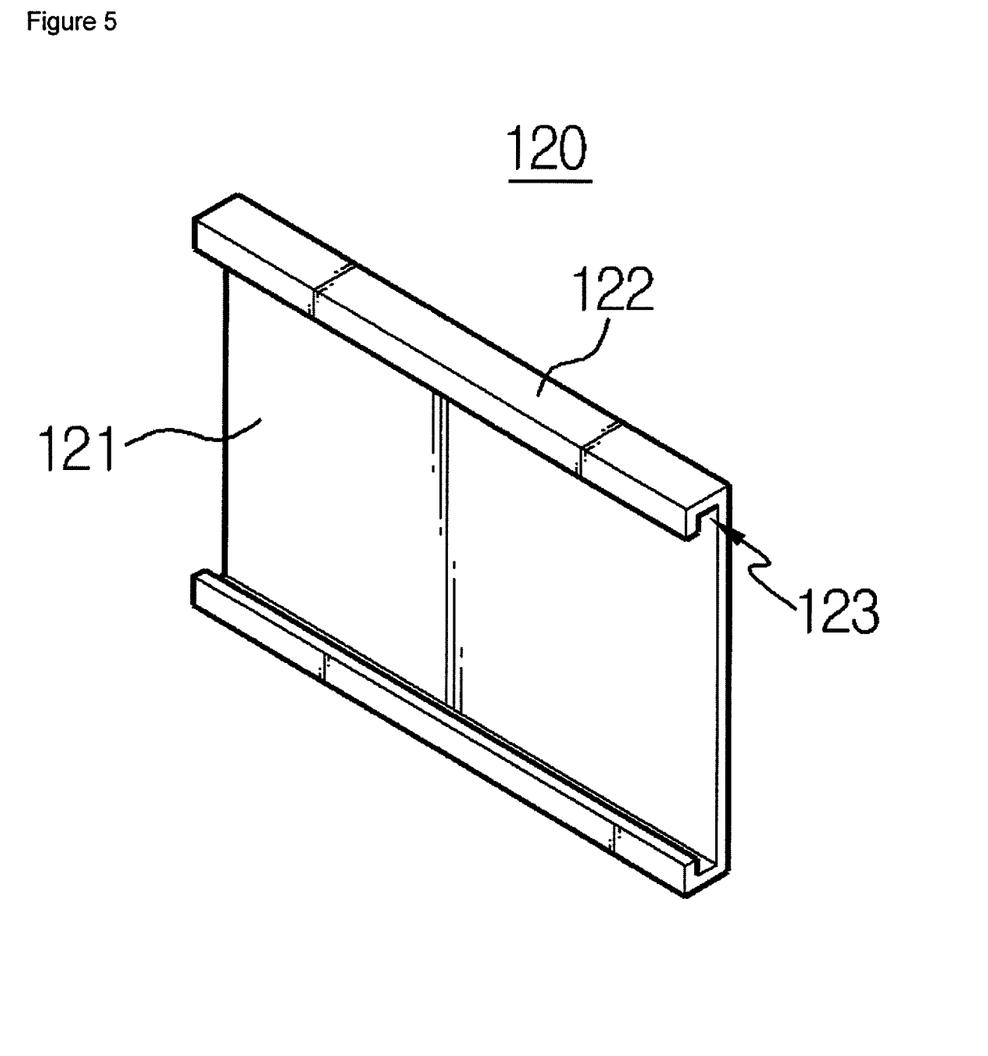
FIG. 5 is a perspective view illustrating a construction of a plate support member of FIG. 1.
Figure 6:
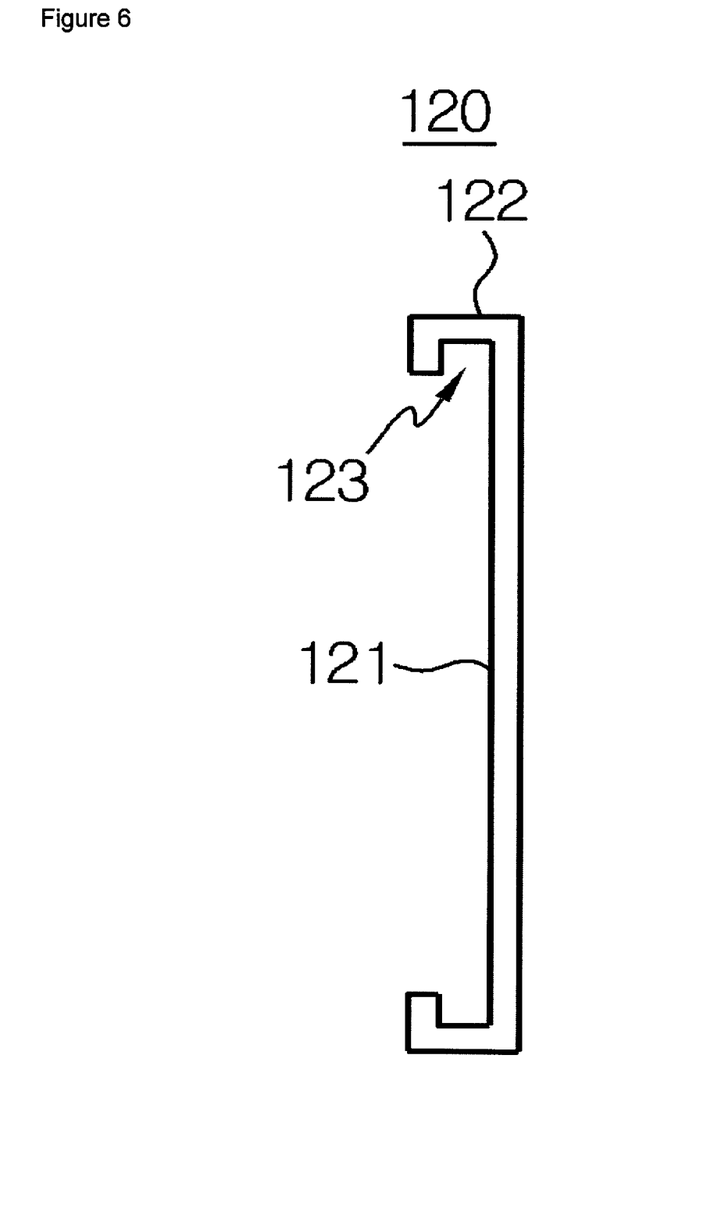
FIG. 6 is a side view of FIG. 5.

As shown in FIGS. 5 and 6, the plate support member 120 is formed in a rectangular shape and comprises a support part 121 corresponding to a plane portion of the base plate 100, and a guide part 122 disposed at an edge portion of each of both sides about the widthwise direction of the support part 121 and formed in a bent structure so that a guide groove 123 guiding an edge portion of each of both sides of the base plate 100 can be longitudinally formed in a longitudinal direction of the plate support member 120. In the above construction, the hinge part, which is the center of the hinge operation, can move toward the outside of the guide part 122 in such a way that the base plate 100 slides in the longitudinal direction of the plate support member 120 along the guide groove 123 while guiding the edge portion of each of both sides of the base plate 100 in the guide part 122. In a state that the hinge part 101 is positioned outside the guide part 122, the base plate 100 can rotate in the forward or backward direction, thus being folded.

It is preferred that the entire length of the plate support member 120 is two times the base plate 100 in a state that it is expanded to have a length corresponding to the base plate 100 in the folded state.

A certain elastic support member might be provided at an inner wall of the guide groove 123, thus stably supporting an edge portion of the base plate 100 in the guide groove 123 during the sliding of the base plate 100, while providing an elastic force toward the edge portion of the base plate 100.

Figure 7:
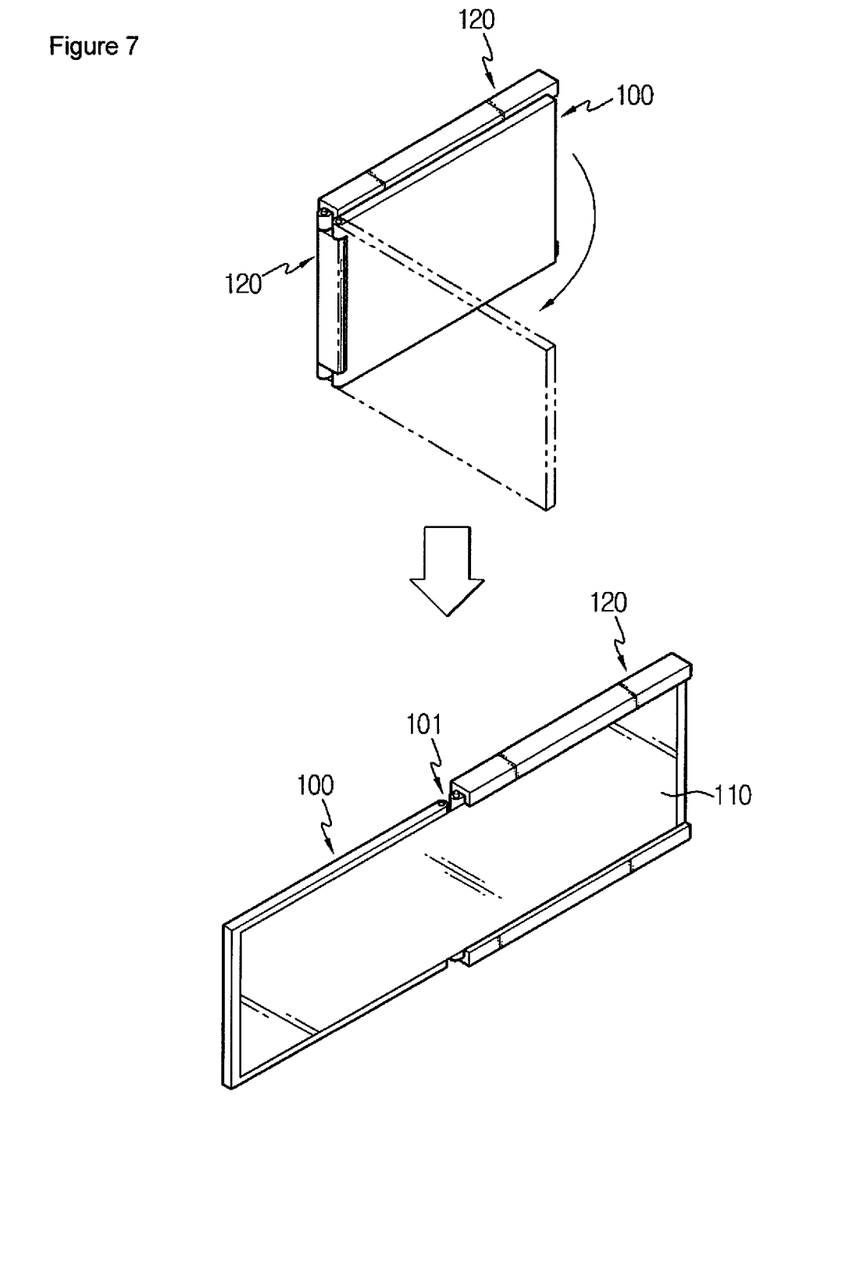
FIGS. 7 and 8 are perspective views illustrating an operation example of a variable display area type display device according to a preferred embodiment of the present invention.
Figure 8:
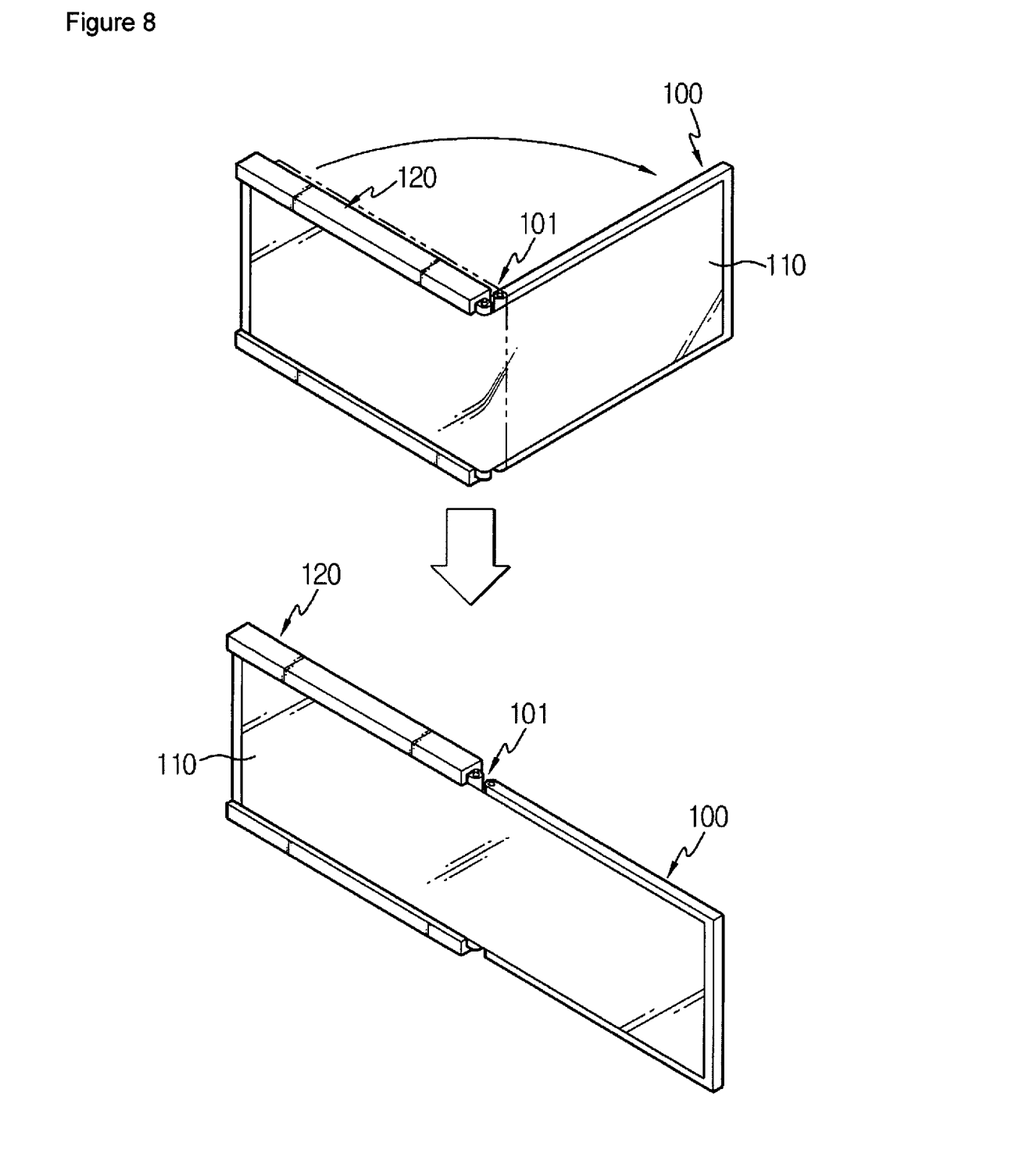
Figure 9:
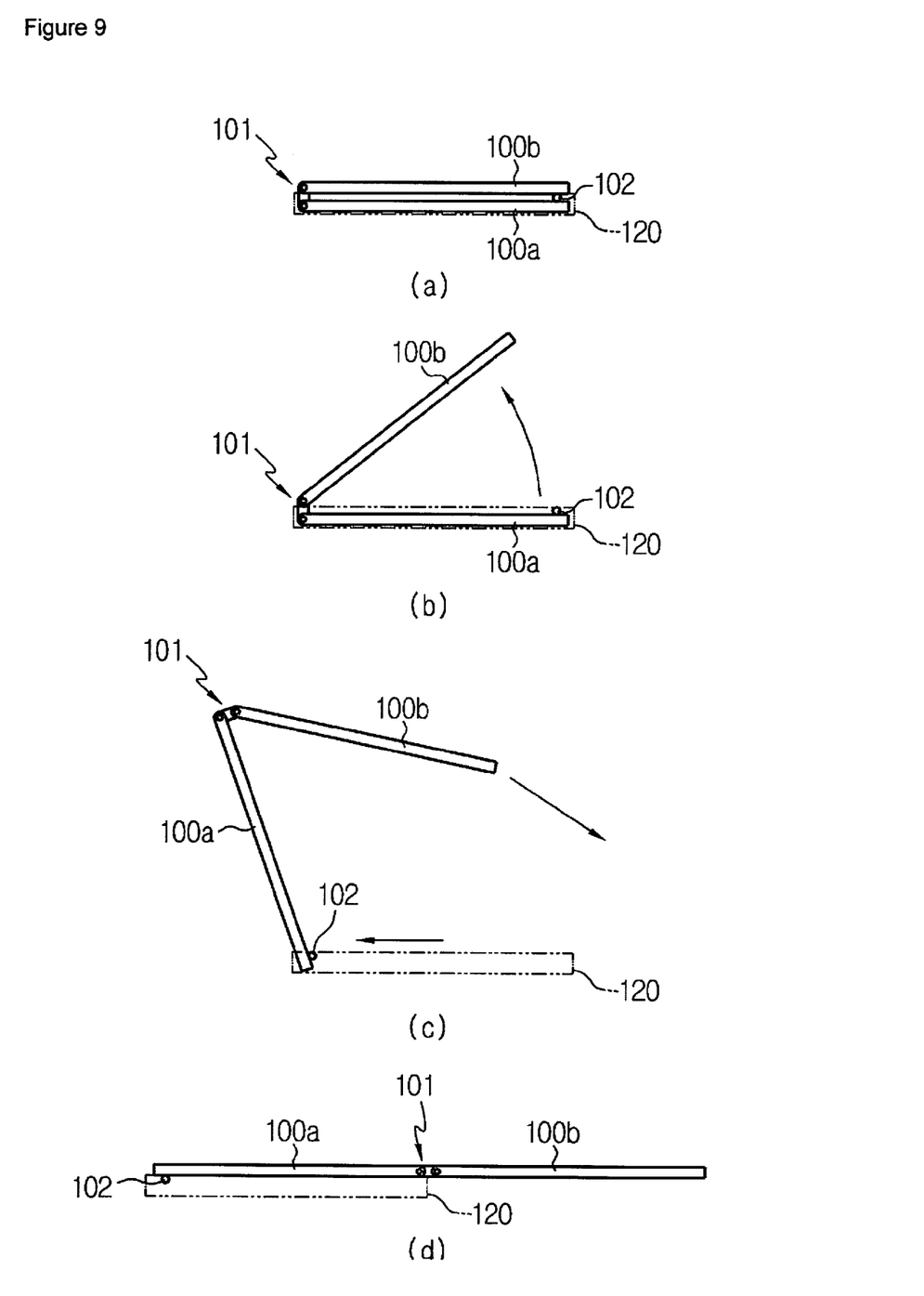
FIG. 9 is a schematic side view illustrating another operation example of a variable display area type display device according to a preferred embodiment of the present invention.

In a state that the base plate 100 is folded, the edge portion of each of both sides of one plate unit between the pair of the plate units 100a and 100b keeps being guided by means of the guide part 122 of the plate support member 120. FIGS. 7 through 9 show the operation examples before and after the folding between the base plate 100 and the plate support member 120 provided from the present invention.

As shown in FIG. 7, each of the both sides of the display part 110 can be folded with their inner sides facing each other about the hinge part 101 of the base plate 100. In this case, the back side of each of both sides of the display part 110 faces outside.

As shown in FIG. 8, alternatively, each of the both sides of the display part 110 can be folded about the hinge part 101 of the base plate 100 so that the display area can be positioned outside. In this case, each of both sides of the display part 110 is positioned at the back side of the plate support member 120.

As shown in FIGS. 7 and 9, it is preferred that the hinge part 101 is positioned at an intermediate portion of a longitudinal direction of the plate support member 120 with the aid of the operation that the base plate 100 slides after each of both sides of the display part 110 is unfolded and expanded about the hinge part 101 of the base plate 100.

As shown in FIG. 9, one plate unit 100a between the pair of the plate units 100a and 100b can be accommodated in the plate support member 120 with its back side, namely, the opposite side where the display part (not shown) positioned, facing outside. As shown in (a) through (d) of FIG. 9, while the pair of the plate units 100a and 100b are being unfolded, the plate unit 100a in the accommodated state slides along the guide groove 123 and is inverted with its whole front sides being exposed to the outside, and then is unfolded. In this case, in the state of (d) of FIG. 9, there might be provided a certain member which prevents the plate unit 100b from sagging downward by means of the hinge part 101 in such a way the plate unit 100b is supported against the plate support member 120. Alternatively, it is desirable that the lengths of the plate units 100a and 100b are designed shorter than the length of the plate support member 120 so that the hinge part 101 can be positioned on the plate support member 120.

In the plate unit 100a, there might be provided a pivot member 102 at an end portion positioned at the opposite portion of the hinge part 101, thus preventing the base plate 100 from escaping from the plate support member 120 and providing a rotation center during the inverted operation.

In the variable display area type display device according to a preferred embodiment of the present invention, since the display part 110 can be folded or unfolded with respect to the plate support member 120, thus reducing or expanding the display area at the outside. It is preferred that the present invention can provide a display area in which the screen size is expanded as it is unfolded when in use from the folded state.

The present invention has been described along with the limited embodiments and with reference to the drawings, but the present invention is not limited thereto. An ordinary person skilled in the art can amend or modify in various forms the present invention not departing from the technical concepts of the present invention and within an equivalent range of the claims.

| Descriptions of reference numerals | |
|---|---|
| 100: base plate | 100a, 100b: plate units |
| 101: hinge part | 110: display part |
| 120: plate support member | 121: support part |
| 122: guide part | 123: guide groove |

INDUSTRIAL ADVANTAGES

The present invention is not limited to the preferred embodiments of the described features, and it is obvious that an ordinary person skilled in the art can modify without departing from the gist of the present invention, and the modified features surely reside in the scope of the claims.

The invention claimed is:

1. A variable display area type display device, comprising:
a base plate having a foldable body;
a display part which is installed at one surface of the base plate and has a display area which varies as the display area is folded and changed by the folding of the base plate;
a plate support member which supports the base plate before or after the base plate is folded;
wherein said base plate comprises a hinge part and a pair of plate unites which are coupled with each other in a foldable way about the hinge part; and
wherein said plate support member comprises a support part corresponding to a plane portion of the base plate and a guide part which is provided at an edge portion of each of both sides of the support part and has a guide groove guiding the edge portion of each of both sides of the base plate.

2. A variable display area type display device according to claim 1, wherein said display part is formed of a flexible display which is entirely attached to the pair of the plate units.

3. A variable display area type display device according to claim 1, wherein said display part is formed of a pair of displays attached corresponding to the pair of the plate units, respectively.

4. A variable display area type display device according to claim 1, wherein in a state that the base plate is folded, an edge portion of each of both sides of one plate unit between the pair of the plate units keeps being guided by means of the guide part.

5. A variable display area type display device according to claim 4, wherein at an end portion of one plate unit, there is provided a pivot member for providing a rotation center for an inverted operation of one plate unit while at the same time preventing the base plate from escaping from the plate support member.

6. A variable display area type display device according to claim 4, wherein said base plate and said plate support member are formed in rectangular shapes, and the entire length of the base plate is two times the length of the plate support member.

* * * * *